Figure 1:
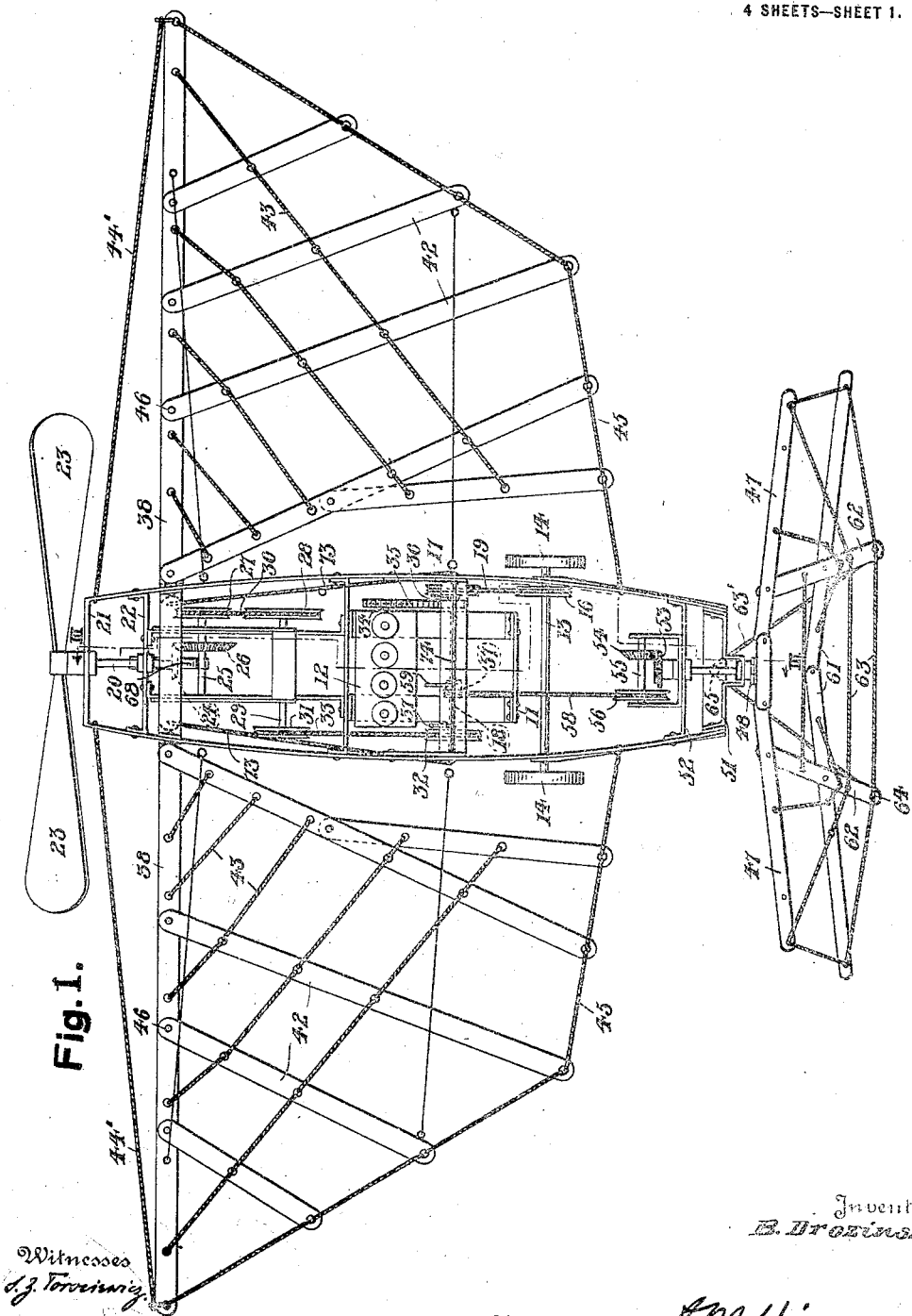

B. DROZINSKI.
COMBINED AERO, HYDRO, AND AUTO PLANE.
APPLICATION FILED FEB. 23, 1915.

1,143,894.

Patented June 22, 1915.
4 SHEETS—SHEET 1.

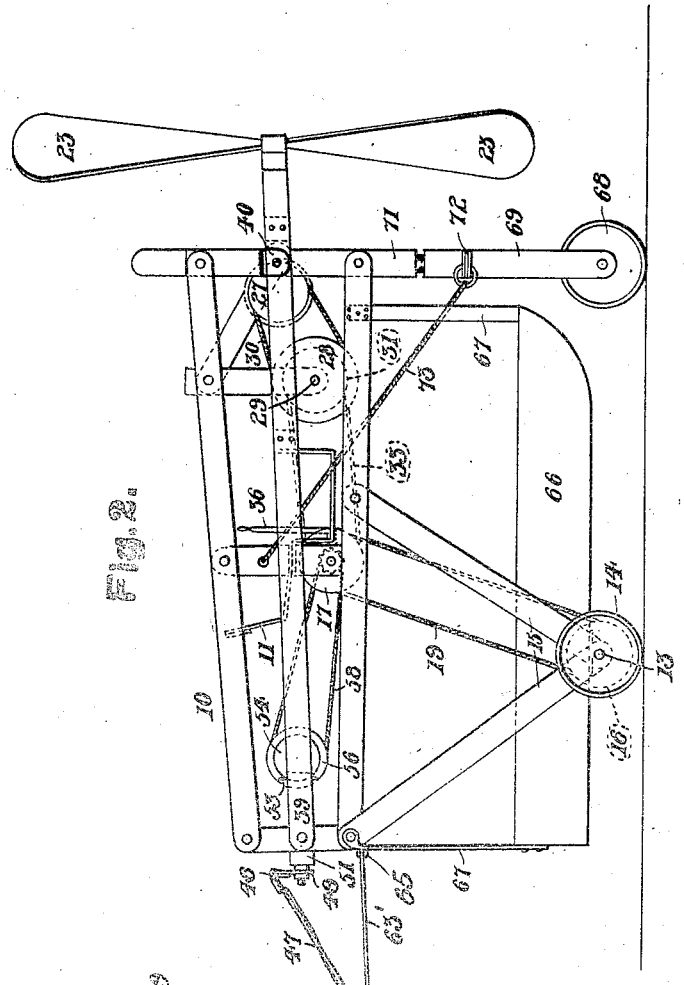

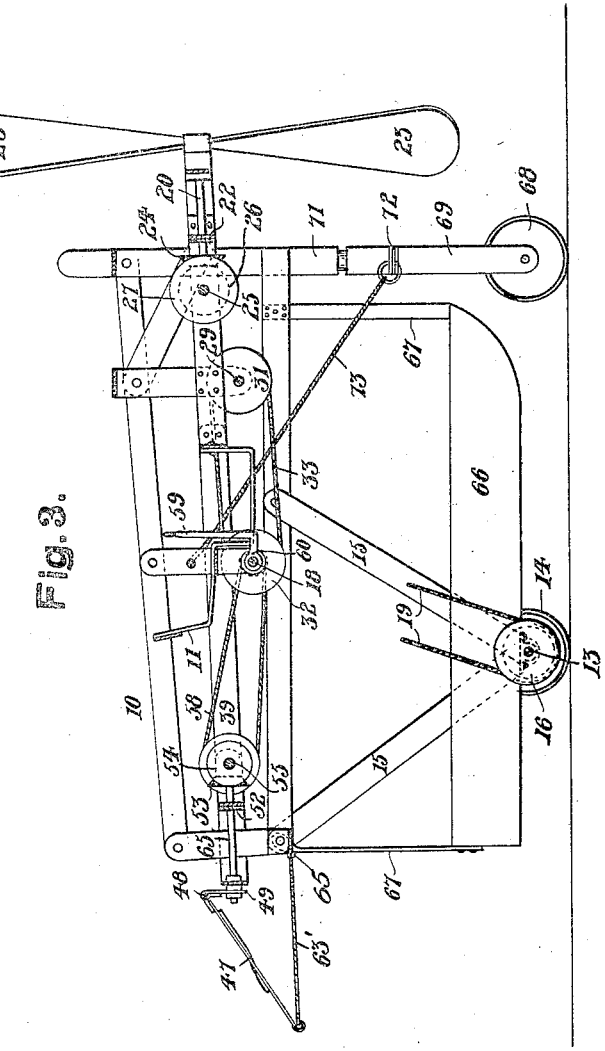

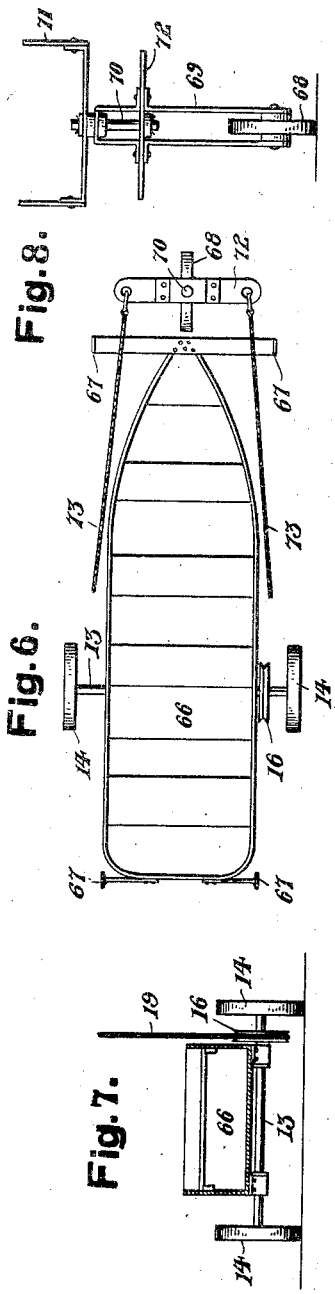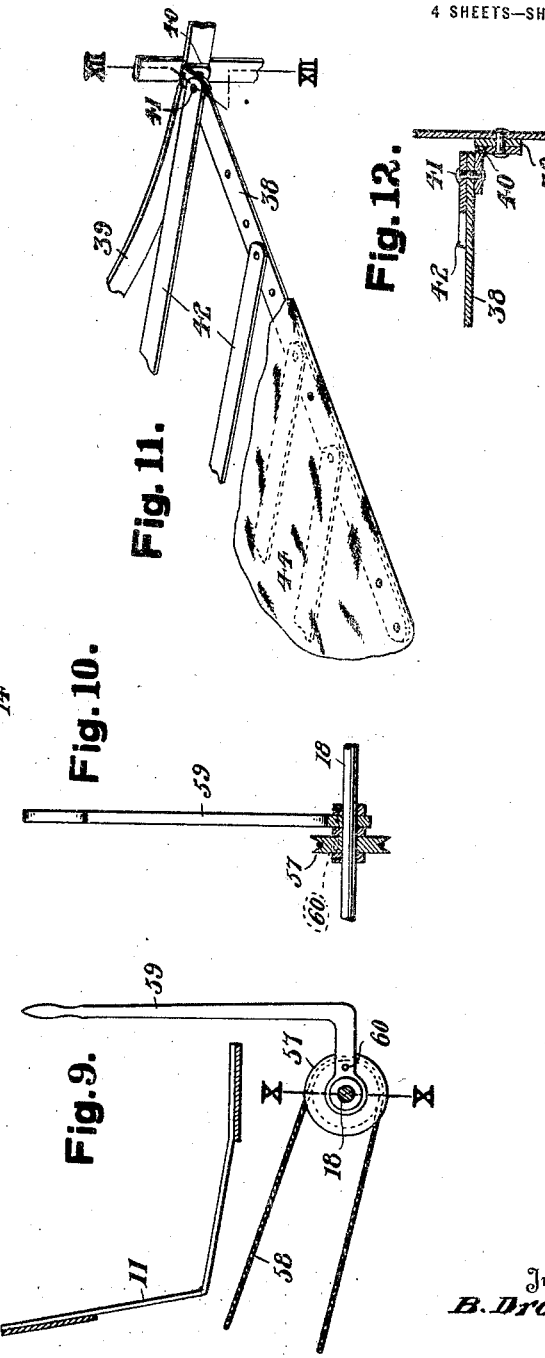

UNITED STATES PATENT OFFICE.

BRONISLAW DROZINSKI, OF SCRANTON, PENNSYLVANIA.

COMBINED AERO, HYDRO, AND AUTO PLANE.

1,143,894.  Specification of Letters Patent.  Patented June 22, 1915.

Application filed February 23, 1915. Serial No. 10,010.

*To all whom it may concern:*

Be it known that I, BRONISLAW DROZINSKI, a subject of the Czar of Russia, residing at Scranton, in the county of Lackawanna and State of Pennsylvania, have invented certain new and useful Improvements in Combined Aero, Hydro, and Auto Planes, of which the following is a specification.

This invention relates to new and useful improvements in combined aero, hydro and auto plane.

The primary object of the invention is the provision of a motor driven aeroplane capable of use as both a hydroplane upon the water and an autoplane for traveling upon the land, the same being capable of carrying a number of persons and also for mounting guns for war purposes if so desired.

A further object is the provision of a frame having side planes and provided with a forwardly positioned propeller and a tiltable rear steering plane, the said propeller being motor actuated and the device being primarily designed for traveling through the air but being capable of traveling upon the water by means of a float attachment and also having motor driven ground traction wheels whereby the device may be propelled at will upon the land.

A still further object is the provision of a compact serviceable combination device having a motor driven propeller and traction wheels and adapted for carrying persons and guns if desired through the air and upon both the water and the land, portions of the device being readily foldable.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a top plan view of the device with the float member removed. Fig. 2 is a side elevation of the device with the side wings removed. Fig. 3 is a longitudinal vertical sectional view taken upon line III—III of Fig. 1. Fig. 4 is an enlarged detail perspective view of the operating means and hinge connection for the steering or tail plane. Fig. 5 is a sectional view taken upon line V—V of Fig. 4. Fig. 6 is a top plan view of the float member, the adjacent members being shown in horizontal section. Fig. 7 is a vertical transverse sectional view of Fig. 6. Fig. 8 is a front elevation of the forward wheel steering means. Fig. 9 is a side elevation of the manual operating means for the steering plane. Fig. 10 is a sectional view taken upon line X—X of Fig. 9. Fig. 11 is a perspective view of a portion of one of the side planes with a portion of the flexible covering shown thereon, and Fig. 12 is a detail sectional view taken upon line XII—XII of Fig. 11.

Referring more in detail to the drawings, the device comprises a car 10 formed of a frame-work substantially boat shaped and having a basket or platform 11 positioned interiorly thereof being adapted for the accommodation of passengers and also for the mounting of a motor 12 for propelling the device.

An axle 13 provided with ground wheels 14 is journaled beneath the rear portion of the car by means of a truss frame or supporting rods 15, it being noted that a pulley wheel 16 is fixed to the said axle and is operatively connected to a similar pulley 17 upon the driven shaft 18 of the motor by means of a belt 19.

A propeller shaft 20 is journaled through the forward end 21 and a forwardly positioned transverse brace rod 22 of the car frame and has a propeller 23 secured to its forward end and a beveled gear 24 fixed to its rear end. A stub shaft 25 is journaled in the car frame-work and is provided with a beveled gear 26 in constant mesh with the propeller shaft gear 24, while a pulley wheel 27 carried by the stub shaft 25 is operatively connected to a similar pulley 28 upon a transversely journaled shaft 29 by means of a belt 30. The said transverse shaft 29 is provided with a second pulley 31 which is operatively connected with a pulley 32 upon the driven shaft 18 of the motor by means of a belt 33.

The motor shaft 34 has operative connections with the driven shaft 18 by means of a sprocket wheel 35 and the traction wheel pulley being journaled upon the driven shaft the same is adapted to be brought into clutching engagement therewith at will by means of the clutch lever 36 and by which arrangement it will be seen that the power of the motor may be transferred to the traction wheels 14 whenever desired and the device thus propelled upon the ground.

The propeller pulley 32 is arranged similarly to the pulley 17 upon the driven shaft and is adapted to be operatively clutched into engagement with the said driven shaft at will by means of a similar clutch lever 37 and by which arrangement it will be seen that the motor 12 will revolve the propeller 23 whenever desired for the purpose of forwardly moving the device either through the air or upon land or water.

Two opposite side planes 38 of similar construction are attached to the middle braces 39 of the car frame by means of hinges 40 and pivots 41, as best illustrated in Figs. 11 and 12 of the drawings. Each of the said side planes or wings has a plurality of lateral braces 42 connected together by means of flexible cords 43, a flexible covering 44 being provided over the entire frame-work of the wings. The wings are provided with forwardly connecting guy ropes 44' and with rear connecting ropes 45 so that the wings may be arranged in substantially horizontal supporting positions being slightly movable upon the hinges 40. All of the braces of the wings are pivotally connected as at 46 so that whenever desired the ropes 44 and 45 may be detached and the wings folded up and may be then moved upon the pivots 41 to lie flatly against the opposite outer sides of the car frame.

A steering or tail plane 47 is positioned at the rear of the car frame and is connected by a hinge 48 with a post 49 which is fixed to the rear end of the steering shaft 50, the said shaft being journaled through the rear end 51 and an adjacent transverse brace 52 of the car frame. The inner end of the steering shaft 50 is provided with a pinion 53 in constant mesh with a similar pinion 54 fixed to a rear stub shaft 55. The said steering stub shaft 55 is provided with a pulley 56 which is operatively connected to a pulley 57 freely journaled upon the driven shaft 18 by means of a belt 58 while an operating lever 59 is secured to the said pulley 57 by means of a pin 60 and whereby it will be evident that any forward or rearward movement of the lever 59 will result in turning the stub shaft 55 and thus revolving the steering shaft 50 and shifting the post 49 with the steering plane 47 secured thereto. The steering or tail plane 47 is formed similar to the side or wing planes 38 and has braces 61 and 62 pivotally connected together and provided with the connecting cords 63 and over which entire frame-work a fabric covering such as 44, as shown in Fig. 11, is adapted to be positioned. The braces 61 are arranged parallel to the members 47 while the braces 62 are angularly disposed relative thereto. The cords 63 being arranged as shown are adapted to hold the braces in correct position. A guy rope 63' is attached at spaced points 64 upon the rear ends of the braces 62 and runs over a centrally positioned pulley 65 carried by the rear portion 51 of the car frame.

A float 66 is supported on the axle 13 of the ground wheels and the same is herein illustrated in the form of a boat and is secured in substantially parallel relation beneath the car frame by means of depending brackets 67. By this arrangement it will be seen that when the device is desired for use upon the water, it is maintained in a floating position thereon by means of the boat member 66 and the occupants of the car may enter the boat if they so desire, it being only necessary, however, that the boat is of sufficient size and buoyancy to maintain the entire device in a floating position upon the surface of the water.

A forward steering wheel 68 is mounted in a frame 69 which is journaled by means of a pivot bolt 70 beneath the forward bracket 71 of the car frame, while a cross arm 72 of the frame 69 has the opposite ends of a steering rope 73 secured thereto, which rope has its central portion 74 positioned transversely through the basket 11 of the car and whereby the operator of the device may readily turn the steering frame 69 as desired in the steering operation when the device is employed upon the land.

From this detailed description of the device, the complete operation thereof will be apparent. With the motor 12 mounted within the car 10 and controlled by the operator of the device, the clutch lever 36 may be operated to allow the motor to revolve the ground wheels 14 and whereby the device will move along the ground and simultaneously therewith, the propeller 23 may be also revolved by the motor 12, as controlled by the other clutch lever 37. When employed as an automobile, the side wings 38 and the tail 47 may be folded if desired, while the traction wheels and the propeller may be used either separately or together. When the device is employed for flying, the ground wheels will be rendered inoperative by moving the clutch lever 36 and the wings being extended act as elevating planes when the device is propelled by the propeller 23, while the steering lever 59 may be moved as desired for shifting the tail 47 and thereby steer the device through the air. When desired for use as a hydroplane, the device floats upon the water by means of the boat or float 66 and the wings and tail may remain extended while the propeller 23 is operated for drawing the device forwardly upon the water in its desired course of travel.

It is obvious that the interior of the car 10 may be arranged for the accommodation of as many operators as well as soldiers as the same will support during its travel while guns may also be mounted at convenient points upon the car when the same is desired for war purposes.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What I claim as new is:—

1. A device of the class described comprising a car frame, a rearwardly positioned transverse brace mounted therein, a steering shaft journaled through the said brace and the rear end of the said frame, a post secured to the rear projecting end of the said shaft, a steering plane hingedly mounted upon the free end of the said post, a flexible connection between the rear portion of the said car frame and said plane, a pulley upon said frame in engagement with the said connection and manual operating means for the said shaft.

2. A device of the class described comprising a car frame, a motor positioned therein, a longitudinally arranged propeller shaft journaled forwardly of the said frame, a propeller upon the forward end of the said shaft, operative connections between the said motor and shaft, traction wheels journaled beneath the rear portion of the said frame, operative connections between said traction wheels and the said motor, a forwardly positioned steering wheel pivoted beneath the said frame, shifting means for the said steering wheel extending to a point adjacent the said motor, a rearwardly positioned steering shaft, a steering plane hingedly attached to the said steering shaft and revolving means for the said steering shaft positioned adjacent the said motor.

3. A device of the class described comprising a car frame, a motor within said frame, a driving shaft for the said motor, a traction wheel pulley, a propeller pulley and a steering pulley freely journaled upon the said shaft, separate clutching means between the said shaft and the said traction wheel and propeller pulleys and an operating turn lever for the said steering pulley fixedly secured to the said steering pulley.

In testimony whereof I affix my signature in presence of two witnesses.

BRONISLAW DROZINSKI.

Witnesses:
 Jos. MALEZENSKI,
 HENLY STECEWICZ.